US008032804B2

(12) United States Patent
Jeddeloh (10) Patent No.: US 8,032,804 B2
(45) Date of Patent: Oct. 4, 2011

(54) SYSTEMS AND METHODS FOR MONITORING A MEMORY SYSTEM

(75) Inventor: Joe M. Jeddeloh, Shoreview, MN (US)

(73) Assignee: Micron Technology, Inc., Boise, ID (US)

( * ) Notice: Subject to any disclaimer, the term of this patent is extended or adjusted under 35 U.S.C. 154(b) by 278 days.

(21) Appl. No.: 12/352,381

(22) Filed: Jan. 12, 2009

(65) Prior Publication Data

US 2010/0180150 A1    Jul. 15, 2010

(51) Int. Cl.
*G11C 29/00* (2006.01)
*G06F 11/00* (2006.01)
*G06F 12/06* (2006.01)
*H01L 21/00* (2006.01)
*H01L 23/02* (2006.01)
*H03K 5/19* (2006.01)

(52) U.S. Cl. ....... 714/721; 714/47.1; 714/718; 714/710; 365/201; 257/686; 327/20; 711/5; 438/107; 438/109

(58) Field of Classification Search ................. 714/47.1, 714/718, 721, 710; 365/201; 257/686; 327/20; 711/5; 438/107, 109
See application file for complete search history.

(56) References Cited

U.S. PATENT DOCUMENTS

| | | | | |
|---|---|---|---|---|
| 6,430,103 | B2 * | 8/2002 | Nakayama et al. | 365/230.03 |
| 6,747,887 | B2 * | 6/2004 | Halbert et al. | 365/51 |
| 6,912,680 | B1 * | 6/2005 | Keeth | 714/736 |
| 7,132,311 | B2 * | 11/2006 | Akiba et al. | 438/109 |
| 7,132,739 | B2 * | 11/2006 | Akiba et al. | 257/686 |
| 7,402,897 | B2 * | 7/2008 | Leedy | 257/678 |
| 7,622,961 | B2 * | 11/2009 | Grochowski et al. | 327/20 |
| 7,769,964 | B2 * | 8/2010 | Newburn et al. | 711/154 |
| 2002/0034377 | A1 * | 3/2002 | Numata | 386/111 |
| 2004/0151043 | A1 | 8/2004 | Leedy | |
| 2004/0260957 | A1 | 12/2004 | Jeddeloh et al. | |
| 2005/0139977 | A1 * | 6/2005 | Nishio et al. | 257/686 |
| 2007/0195613 | A1 | 8/2007 | Rajan et al. | |
| 2008/0010435 | A1 | 1/2008 | Smith et al. | |
| 2008/0016401 | A1 | 1/2008 | Jeddeloh | |
| 2008/0237591 | A1 * | 10/2008 | Leedy | 257/48 |
| 2008/0254572 | A1 * | 10/2008 | Leedy | 438/109 |
| 2008/0284611 | A1 * | 11/2008 | Leedy | 340/815.4 |
| 2009/0196093 | A1 * | 8/2009 | Happ et al. | 365/163 |
| 2010/0005376 | A1 * | 1/2010 | LaBerge et al. | 714/819 |
| 2010/0091537 | A1 * | 4/2010 | Best et al. | 365/51 |
| 2010/0106901 | A1 * | 4/2010 | Higeta et al. | 711/106 |

FOREIGN PATENT DOCUMENTS

WO  WO-2010081157 A2  7/2010
WO  WO-2010081157 A3  10/2010

OTHER PUBLICATIONS

"International Application Serial No. PCT/US2010/020786, Search Report mailed Aug. 13, 2010", 6 pgs.
"International Application Serial No. PCT/US2010/020786, Written Opinion mailed Aug. 13, 2010", 4 pgs.

* cited by examiner

*Primary Examiner* — John J Tabone, Jr.
(74) *Attorney, Agent, or Firm* — Schwegman, Lundberg & Woessner, P.A.

(57) ABSTRACT

Systems and methods are disclosed herein, including those that operate to monitor a first set of operational parameters associated with a memory vault, to adjust a second set of operational parameters associated with the memory vault, and to perform alerting and reporting operations to a host device.

42 Claims, 9 Drawing Sheets

SYSTEMS AND METHODS FOR MONITORING A MEMORY SYSTEM

TECHNICAL FIELD

Various embodiments described herein relate to systems and methods associated with semiconductor memories and systems and methods for monitoring a memory system.

BACKGROUND INFORMATION

Microprocessor technology has evolved at a faster rate than that of semiconductor memory technology. As a result, a mis-match in performance often exists between the modern host processor and the semiconductor memory subsystem to which the processor is mated to receive instructions and data. For example, it is estimated that some high-end servers idle three out of four clocks waiting for responses to memory requests.

In addition, the evolution of software application and operating system technology has increased demand for higher-density memory subsystems as the number of processor cores and threads continues to increase. However, current-technology memory subsystems often represent a compromise between performance and density. Higher bandwidths may limit the number of memory cards or modules that may be connected in a system without exceeding JEDEC electrical specifications.

Extensions to the JEDEC interface have been proposed but may be generally found lacking as to future anticipated memory bandwidths and densities. Weaknesses include lack of memory power optimization and the uniqueness of the interface between the host processor and the memory subsystem. The latter weakness may result in a need to redesign the interface as processor and/or memory technologies change.

DETAILED DESCRIPTION

Figure 1:
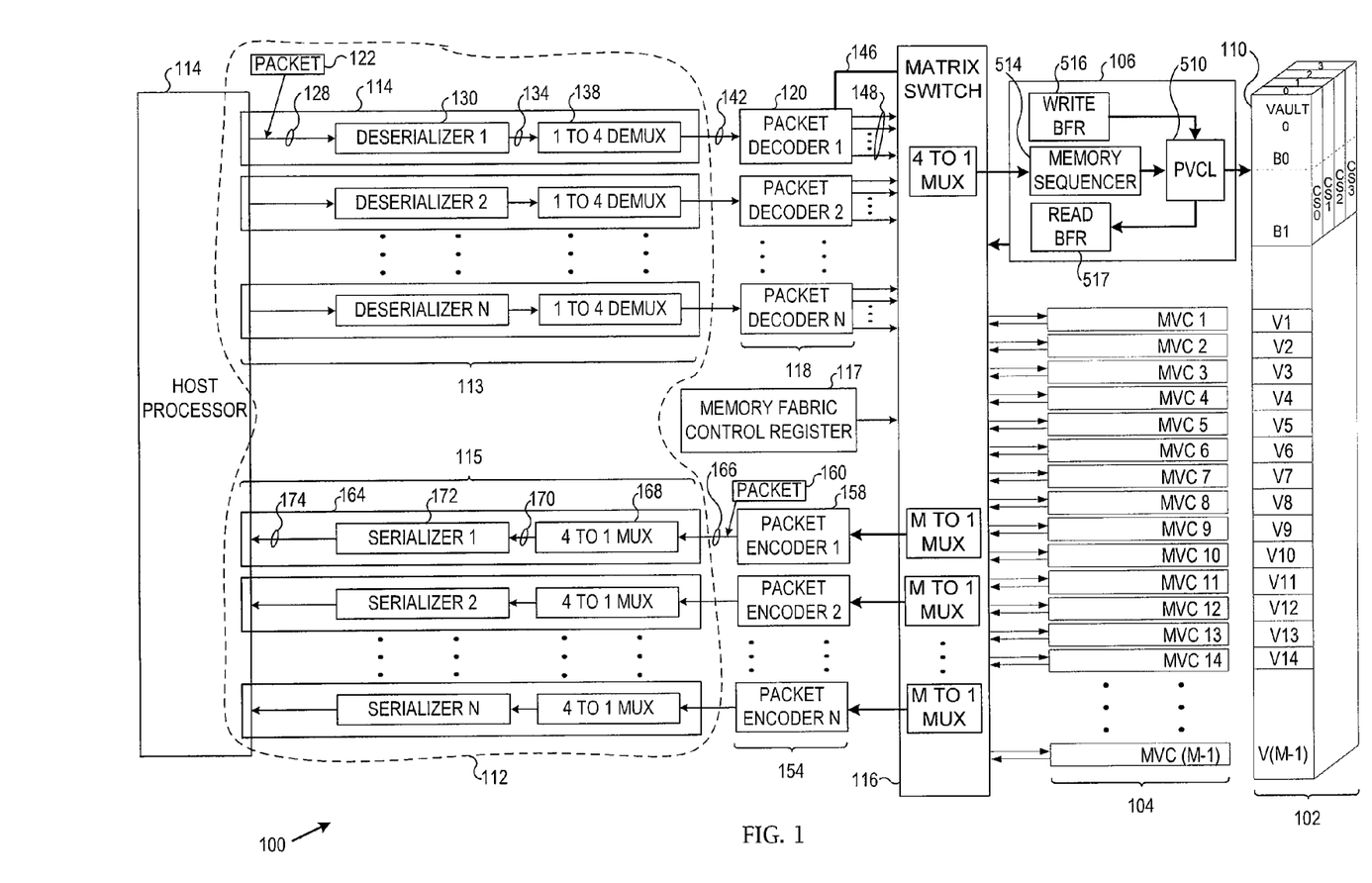
FIG. 1 is a block diagram of a memory system according to various example embodiments of the current invention.

FIG. 1 is a block diagram of a memory system 100 according to various example embodiments of the current invention. One or more embodiments operate to substantially concurrently transfer a plurality of outbound streams of commands, addresses, and/or data between one or more originating devices (e.g., one or more processors) and a set of stacked-array memory "vaults." Increased memory system density, bandwidth, parallelism, and scalability may result.

Multi-die memory array embodiments herein aggregate control logic that is normally located on each individual memory array die in previous designs. Subsections of a stacked group of dies, referred to herein as a "memory vault," share common control logic. The memory vault architecture strategically partitions memory control logic to increase energy efficiency while providing a finer granularity of powered-on memory banks. Embodiments herein also enable a standardized host processor to memory system interface. The standardized interface may reduce re-design cycle times as memory technology evolves.

Figure 2:
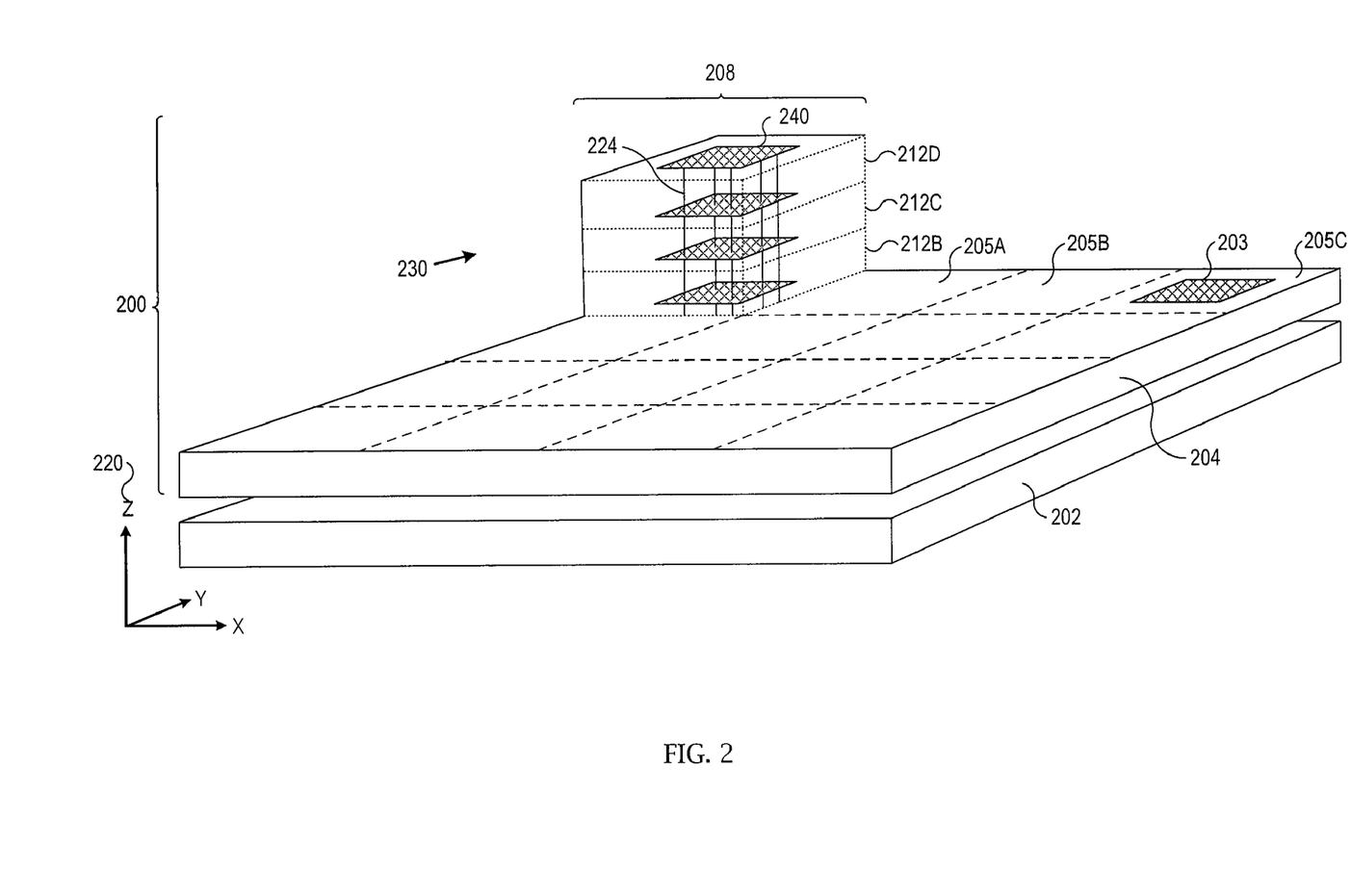
FIG. 2 is a cut-away conceptual view of a stacked-die 3D memory array stacked with a logic die according to various example embodiments.

FIG. 2 is a cut-away conceptual view of a stacked-die 3D memory array 200 stacked with a logic die 202 according to various example embodiments. The memory system 100 incorporates one or more stacks of tiled memory arrays such as the stacked-die 3D memory array 200. Multiple memory arrays (e.g., the memory array 203) are fabricated onto each of a plurality of stacked dies (e.g., the stacked die 204).

Each of the stacked dies is logically divided into multiple "tiles" (e.g., the tiles 205A, 205B, and 205C associated with the stacked die 204). Each tile (e.g., the tile 205C) may include one or more memory arrays 203. In some embodiments, each memory array 203 may be configured as one or more independent memory banks in the memory system 100. The memory arrays 203 are not limited to any particular memory technology and may include dynamic random-access memory (DRAM), static random access memory (SRAM), flash memory, etc.

A stacked set of memory array tiles 208 may include a single tile from each of the stacked dies (e.g., the tiles 212B, 212C and 212D, with the base tile hidden from view in FIG. 1). Power, address, and/or data and similar common signals may traverse the stacked set of tiles 208 in the "Z" dimension 220 on conductive paths (e.g., the conductive path 224), such as through-wafer interconnects (TWIs). The stacked-die 3D memory array 200 is thus partitioned into a set of memory "vaults" (e.g., the memory vault 230). Each memory vault includes a stacked set of tiles, one tile from each of a plurality of stacked dies. Each tile of the vault includes one or more memory arrays (e.g., the memory array 240).

The resulting set of memory vaults 102 is shown in FIG. 1. Control, switching, and communication logic described here below is fabricated onto the logic die 202. The memory system 100 includes a plurality of memory vault controllers (MVCs) 104 (e.g., the MVC 106). Each MVC is communicatively coupled to a corresponding memory vault (e.g., the memory vault 110) in a one-to-one relationship. Each MVC is thus capable of communicating with a corresponding memory vault independently from communications between other MVCs and their respective memory vaults.

The memory system 100 also includes a plurality of configurable serialized communication link interfaces (SCLIs) 112. The SCLIs 112 are divided into an outbound group of SCLIs 113 (e.g., the outbound SCLI 114) and an inbound group of SCLIs 115. Each of the plurality of SCLIs 112 is capable of concurrent operation with the other SCLIs 112. Together the SCLIs 112 communicatively couple the plurality of MVCs 104 to one or more host processor(s) 114. The memory system 100 presents a highly abstracted, multi-link, high-throughput interface to the host processor(s) 114.

The memory system 100 may also include a matrix switch 116. The matrix switch 116 is communicatively coupled to the plurality of SCLIs 112 and to the plurality of MVCs 104. The matrix switch 116 is capable of cross-connecting each SCLI to a selected MVC. The host processor(s) 114 may thus access the plurality of memory vaults 102 across the plurality of SCLIs 112 in a substantially simultaneous fashion. This architecture can provide the processor-to-memory bandwidth needed by modem processor technologies, including multi-core technologies.

The memory system 100 may also include a memory fabric control register 117 communicatively coupled to the matrix switch 116. The memory fabric control register 117 accepts memory fabric configuration parameters from a configuration source and configures one or more components of the memory system 100 to operate according to a selectable mode. For example, the matrix switch 116 and each of the plurality of memory vaults 102 and the plurality of MVCs 104 may normally be configured to operate independently of each other in response to separate memory requests. Such a configuration may enhance memory system bandwidth as a result of the parallelism between the SCLIs 112 and the memory vaults 102.

Alternatively, the memory system 100 may be reconfigured via the memory fabric control register 117 to cause a subset of two or more of the plurality of memory vaults 102 and a corresponding subset of MVCs to operate synchronously in response to a single request. The latter configuration may be used to access a wider-than-normal data word to decrease latency, as further described below. Other configurations may be enabled by loading a selected bit pattern into the memory fabric control register 117.

Figure 3:
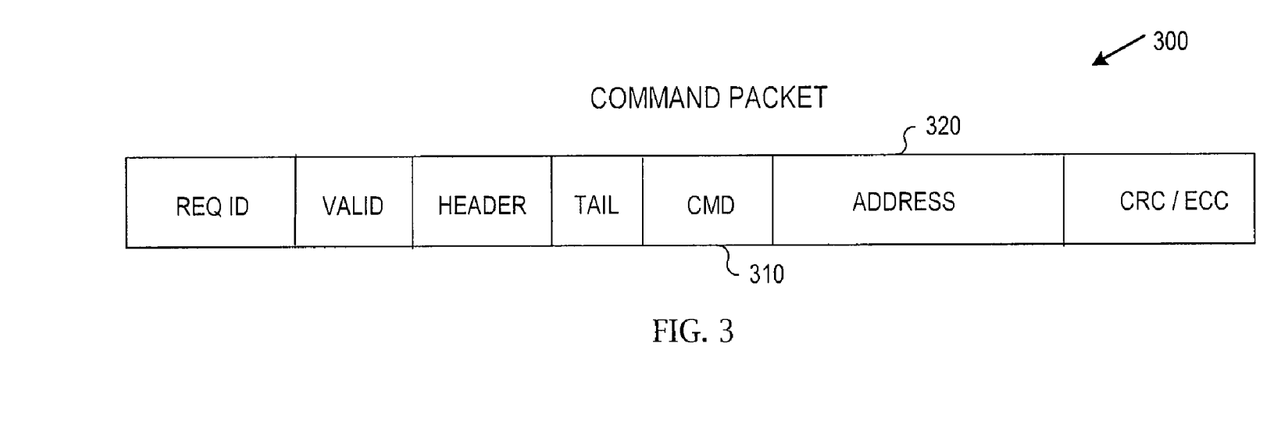
FIGS. 3 and 4 are packet diagrams showing fields associated with example packets according to various example embodiments.
Figure 4:
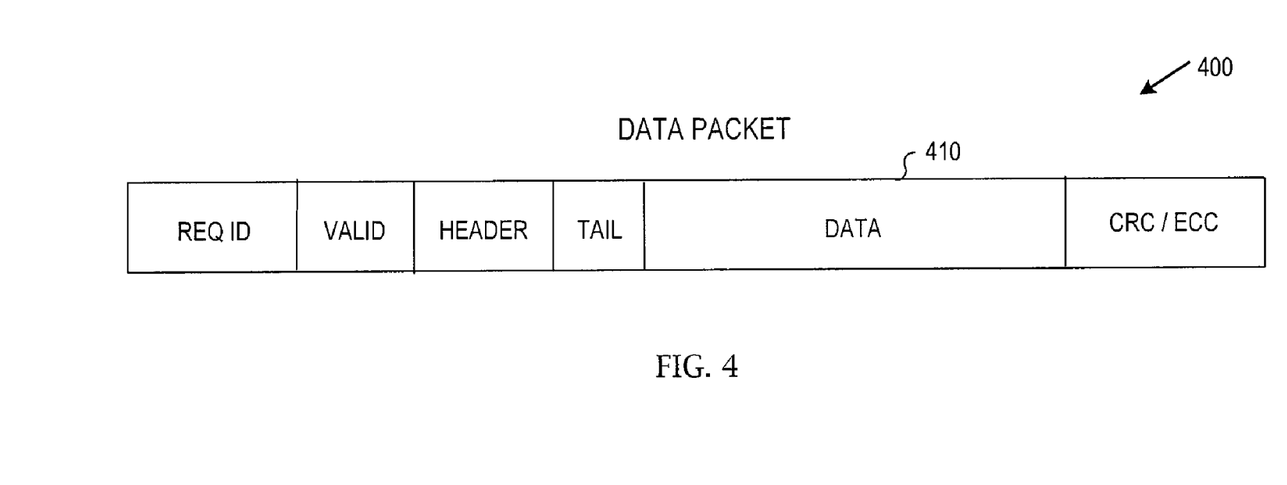

FIGS. 3 and 4 are packet diagrams showing fields associated with example packets 300 and 400, respectively, according to various example embodiments. Turning to FIG. 1 in light of FIGS. 3 and 4, the memory system 100 may also include a plurality of packet decoders 118 (e.g., the packet decoder 120) communicatively coupled to the matrix switch 116. The host processor(s) 114 assemble an outbound packet 122 that in some embodiments may be similar in structure to the example packet 300 or 400. That is, the outbound packet 122 may contain a command field 310, an address field 320, and/or a data field 410. The host processor 114 then sends the outbound packet 122 across an outbound SCLI (e.g., the outbound SCLI 114) to the packet decoder 120 in a manner further explained below.

The outbound SCLI 114 may include a plurality of outbound differential pair serial paths (DPSPs) 128. The DPSPs 128 are communicatively coupled to the host processor(s) 114 and may collectively transport the outbound packet 122. That is, each DPSP of the plurality of outbound DPSPs 128 may transport a first data rate outbound sub-packet portion of the outbound packet 122 at a first data rate.

The outbound SCLI 114 may also include a deserializer 130 communicatively coupled to the plurality of outbound DPSPs 128. The deserializer 130 converts each first data rate outbound sub-packet portion of the outbound packet 122 to a plurality of second data rate outbound sub-packets. The plurality of second data rate outbound sub-packets is sent across a first plurality of outbound single-ended data paths (SEDPs) 134 at a second data rate. The second data rate is slower than the first data rate.

The outbound SCLI 114 may also include a demultiplexer 138 communicatively coupled to the deserializer 130. The demultiplexer 138 converts each of the plurality of second data rate outbound sub-packets to a plurality of third data rate outbound sub-packets. The plurality of third data rate outbound sub-packets is sent across a second plurality of outbound SEDPs 142 to the packet decoder 120 at a third data rate. The third data rate is slower than the second data rate.

The packet decoder 120 receives the outbound packet 122 and extracts the command field 310 (e.g., of the example packet 300), the address field 320 (e.g., of the example packet 300), and/or the data field (e.g., of the example packet 400). In some embodiments, the packet decoder 120 decodes the address field 320 to determine a corresponding set of memory vault select signals. The packet decoder 120 presents the set of memory vault select signals to the matrix switch 116 on an interface 146. The vault select signals cause the input data paths 148 to be switched to the MVC 106 corresponding to the outbound packet 122.

Turning now to a discussion of the inbound data paths, the memory system 100 may include a plurality of packet encoders 154 (e.g., the packet encoder 158) communicatively coupled to the matrix switch 116. The packet encoder 158 may receive an inbound memory command, an inbound memory address, and/or inbound memory data from one of the plurality of MVCs 104 via the matrix switch 116. The packet encoder 158 encodes the inbound memory command, address, and/or data into an inbound packet 160 for transmission across an inbound SCLI 164 to the host processor(s) 114.

In some embodiments, the packet encoder 158 may segment the inbound packet 160 into a plurality of third data rate inbound sub-packets. The packet encoder 158 may send the plurality of third data rate inbound sub-packets across a first plurality of inbound single-ended data paths (SEDPs) 166 at a third data rate. The memory system 100 may also include a multiplexer 168 communicatively coupled to the packet encoder 158. The multiplexer 168 may multiplex each of a plurality of subsets of the third data rate inbound sub-packets into a second data rate inbound sub-packet. The multiplexer 168 sends the second data rate inbound sub-packets across a second plurality of inbound SEDPs 170 at a second data rate that is faster than the third data rate.

The memory system 100 may further include a serializer 172 communicatively coupled to the multiplexer 168. The serializer 172 aggregates each of a plurality of subsets of the second data rate inbound sub-packets into a first data rate inbound sub-packet. The first data rate inbound sub-packets are sent to the host processor(s) 114 across a plurality of inbound differential pair serial paths (DPSPs) 174 at a first data rate that is faster than the second data rate. Command, address, and data information is thus transferred back and forth between the host processor(s) 114 and the MVCs 104 across the SCLIs 112 via the matrix switch 116.

Figure 5:
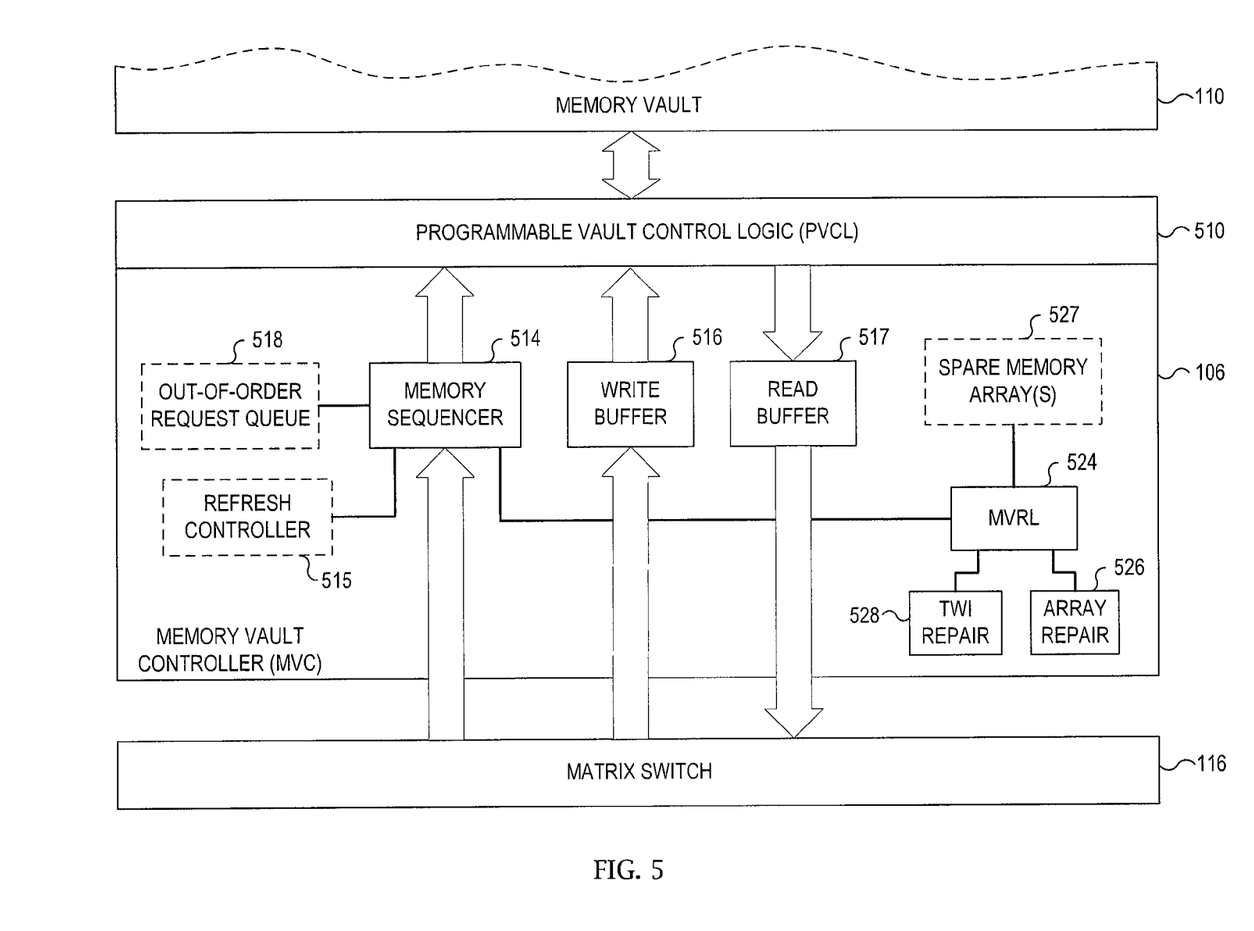
FIG. 5 is a block diagram of a memory vault controller and associated modules according to various example embodiments.

FIG. 5 is a block diagram of an MVC (e.g., the MVC 106) and associated modules according to various example embodiments. The MVC 106 may include a programmable vault control logic (PVCL) component (e.g., the PVCL 510). The PVCL 510 interfaces the MVC 106 to the corresponding memory vault (e.g., the memory vault 110). The PVCL 510 generates one or more bank control signals and/or timing signals associated with the corresponding memory vault 110.

The PVCL 510 may be configured to adapt the MVC 106 to a memory vault 110 of a selected configuration or a selected technology. Thus, for example, the memory system 100 may initially be configured using currently-available DDR2 DRAMs. The memory system 100 may subsequently be adapted to accommodate DDR3-based memory vault technology by reconfiguring the PVCL 510 to include DDR3 bank control and timing logic.

The MVC 106 may also include a memory sequencer 514 communicatively coupled to the PVCL 510. The memory sequencer 514 performs a memory technology dependent set of operations based upon the technology used to implement the associated memory vault 110. The memory sequencer 514 may, for example, perform command decode operations, memory address multiplexing operations, memory address demultiplexing operations, memory refresh operations, memory vault training operations, and/or memory vault prefetch operations associated with the corresponding memory vault 110. In some embodiments, the memory sequencer 514 may comprise a DRAM sequencer. In some embodiments, memory refresh operations may originate in a refresh controller 515.

The memory sequencer 514 may be configured to adapt the memory system 100 to a memory vault 110 of a selected configuration or technology. For example, the memory sequencer 514 may be configured to operate synchronously with other memory sequencers associated with the memory system 100. Such a configuration may be used to deliver a wide data word from multiple memory vaults to a cache line (not shown) associated with the host processor(s) 114 in response to a single cache line request.

The MVC 106 may also include a write buffer 516. The write buffer 516 may be communicatively coupled to the PVCL 510 to buffer data arriving at the MVC 106 from the host processor(s) 114. The MVC 106 may further include a read buffer 517. The read buffer 517 may be communicatively coupled to the PVCL 510 to buffer data arriving at the MVC 106 from the corresponding memory vault 110.

The MVC 106 may also include an out-of-order request queue 518. The out-of-order request queue 518 establishes an ordered sequence of read and/or write operations to the plurality of memory banks included in the memory vault 110. The ordered sequence is chosen to avoid sequential operations to any single memory bank in order to reduce bank conflicts and to decrease read-to-write turnaround time.

The MVC 106 may also include a memory vault repair logic (MVRL) component 524. The MVRL 524 may be communicatively coupled to the memory vault 110 to perform defective memory array address remapping operations using array repair logic 526. The MVRL 524 may also perform TWI repair operations associated with the memory vault 110 using TWI repair logic 528.

Figure 5A:
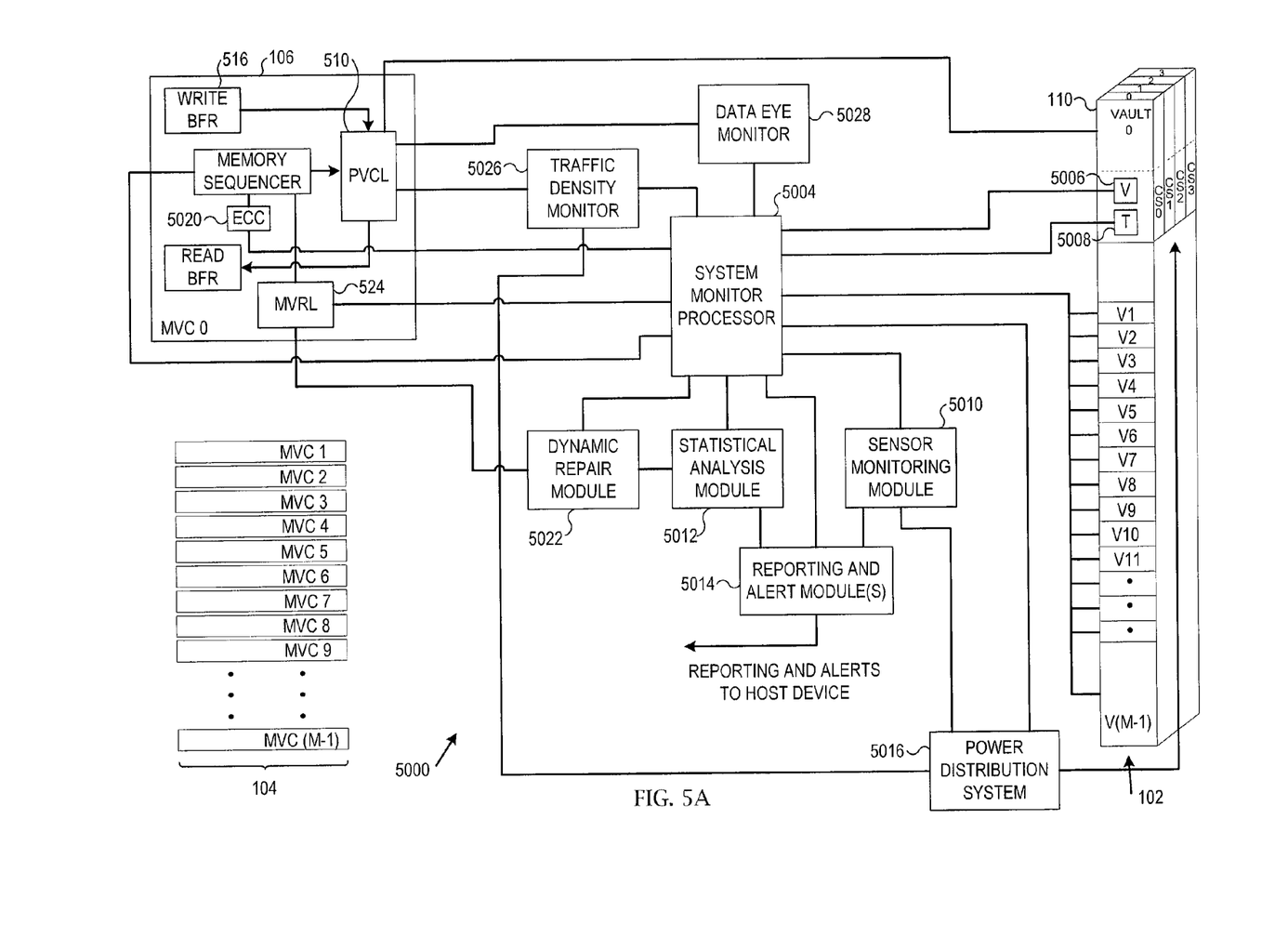
FIG. 5A is a block diagram of a memory system according to various example embodiments.

FIG. 5A is a block diagram of a memory system 5000 according to various example embodiments. The memory system 5000 may include a set of memory vaults 102 (e.g., the memory vault 110) and a corresponding set of MVCs 104 (e.g., the MVC 106). The MVCs are fabricated on a logic die (e.g., the logic die 202 of FIG. 2) stacked with memory array dies (e.g., the memory array die 204 of FIG. 2), as previously discussed.

The following discussion of FIG. 5A refers to connections between the example memory vault 110, the example MVC 106, and various structural elements associated with the monitoring and control of the memory system 5000. It is noted, however, that the connections and functionality described below and illustrated on FIG. 5A apply to each one of the set of memory vaults 102 and to each one of the set of MVCs 104.

The memory system 5000 may also include a system monitor processor 5004 (which could include an embedded processor or a state machine, for example). The system monitor processor 5004 is communicatively coupled to each of the set of memory vaults 102 and to each of the set of MVCs 104. The processor 5004 monitors at least one operation parameter, such as a first set of operational parameters, associated with the memory vault and performs alerting and/or reporting operations to a host device (not shown in FIG. 5A). In some embodiments, the processor 5004 may also adjust at least one operation parameter, such as a second set of operational parameters, associated with the memory vault 110, as further described below.

The memory system 5000 may further include one or more sensors (e.g., the voltage sensor 5006, the temperature sensor 5008 and/or a bit error detector) communicatively coupled to the system monitor processor 5004. The sensors 5006 and 5008 are merely examples; other sensors may be included in various embodiments. The sensors may sense a set of values (e.g., a set of voltages or a set of temperatures) associated with the first set of operational parameters.

A sensor monitoring module 5010 may be communicatively coupled to the system monitor processor 5004. The sensor monitoring module 5010 stores the set of sensed values. In some embodiments, the sensor monitoring module 5010 also compares the sensed values to a corresponding set of alert threshold values.

The memory system 5000 may also include a statistical analysis module 5012 communicatively coupled to the system monitor processor 5004. The statistical analysis module 5012 performs statistical calculations on the set of sensed values.

The memory system 5000 may further include a reporting and alert module 5014 communicatively coupled to the system monitor processor 5004. The reporting and alert module 5014 alerts the host device if a sensed value exceeds a corresponding alert threshold value. In some embodiments, the reporting and alert module 5014 also reports statistical and performance data to the host device.

A power distribution system 5016 may be communicatively coupled to the system monitor processor 5004. The power distribution system 5016 receives operational parameter sensor data (e.g., voltage level measurements or temperature measurements) from sensors (e.g., the sensors 5006 and 5008) within the memory vault 110. The power distribution system 5016 adjusts supply voltage levels to subsections (e.g., to a memory array die or to an individual memory array on the die) of the memory vault 110 according to a power usage level associated with each array.

The memory system 5000 may also include an error monitor, such as an error correction code (ECC) module 5020, communicatively coupled to a dynamic repair module 5022. In some embodiments, the dynamic repair module 5022 may be coupled to the ECC module 5020 via the MVRL 524. The ECC module 5020 detects one or more soft error corrections, hard bit failures, refresh adjustments, and/or failed vias. The dynamic repair module 5022 is communicatively coupled to the system monitor processor 5004. The dynamic repair module 5022 receives notifications of the soft error corrections, hard bit failures, refresh adjustments, and/or via failures and takes corrective action.

Memory vault repair logic (MVRL) 524 may be communicatively coupled to the dynamic repair module 5022. The MVRL 524 redirects the memory requests from the failed memory arrays to the spare memory arrays. In some embodiments, the MVRL 524 also redirects the memory vault signals from the failed vias to the spare vias.

The memory system 5000 may further include a PVCL 510. The PVCL 510 transfers data and address words between the host device and the memory vault 110 via communication links (e.g., the communication links 112 of FIG. 1), as previously described. The PVCL 510 also decodes the address words to obtain subsection addresses (e.g., die addresses, array addresses, row addresses, and column addresses) corresponding to each of a number of memory vault subsections.

A traffic density monitor 5026 may be communicatively coupled to the system monitor processor and/or to the PVCL 510. The traffic density monitor 5026 monitors the frequency of access to each of several memory vault subsections. In some embodiments, the traffic density monitor 5026 also monitors traffic volumes across the communication links and reports frequency-of-access and traffic volume statistics to the host device.

In some embodiments, the traffic density monitor 5026 is configured to direct the PVCL 510 to perform load-balancing operations. For example, the traffic density monitor 5026 may direct the PVCL 510 to substitute subsection addresses corresponding to underutilized subsections of the memory vault 110 in place of subsection addresses corresponding to overutilized subsections. Such operations may result in decreased latency and/or higher throughput.

In some embodiments, the traffic density monitor 5026 may be configured to provide feed-forward information to the power distribution system 5016. The feed-forward information may include recent history and/or projections of subsection utilization, for example. The power distribution system 5016 may utilize the feed-forward information to anticipate power requirements at the various subsections of the memory vault 110.

The memory system 5000 may also include a data eye monitor 5028 communicatively coupled to the system monitor processor 5004 and/or to the PVCL 510. The data eye monitor 5028 conducts periodic data strobe positioning adjustment routines and tracks trends related to data strobe drift on an individual memory vault basis. That is, data strobe timing to a memory vault, to a memory vault die, or to a memory cell array on a die may be adjusted incrementally through a range while performing a sequence of read or write accesses. Limits of the range may be determined by detecting read or write errors. The center of the range may be calculated as a mid-point between the limits and may be selected as the desired strobe timing, the center of the "data eye." In some embodiments, data strobe adjustment may be performed individually for each of several dies comprising a memory vault. Any of the components previously described may be implemented in a number of ways, including embodiments in hardware, software, firmware, or combinations thereof. It is noted that "software" in this context refers to statutory software structures and not to mere software listings.

Thus, the memory system 100; the memory arrays 200, 203, 240, 527; the die 202, 204; the tiles 205A, 205B, 205C, 208, 212B, 212C, 212D; the "Z" dimension 220; the paths 224, 148; the memory vaults 230, 102, 110; the MvCs 104, 106; the SCLIs 112, 113, 114, 115, 164; the processor(s) 114; the matrix switch 116; the register 117; the packets 300, 400, 122, 160; the packet decoders 118, 120; the fields 310, 320, 410; the DPSPs 128, 174; the deserializer 130; the SEDPs 134, 142, 166, 170; the demultiplexer 138; the interface 146; the packet encoders 154, 158; the multiplexer 168; the serializer 172; the PVCL 510; the memory sequencer 514; the refresh controller 515; the buffers 516, 517; the out-of-order request queue 518; the MVRL 524; the array repair logic 526; the TWI repair logic 528; the memory system 5000; the system monitor processor 5004; the sensors 5006, 5008; the sensor monitoring module 5010; the statistical analysis module 5012; the reporting and alert module 5014; the power distribution system 5016; the ECC module 5020; the dynamic repair module 5022; the traffic density monitor 5026; and the data eye monitor 5028 may all be characterized as "modules" herein.

The modules may include hardware circuitry, optical components, single or multi-processor circuits, memory circuits, software program modules and objects (but not software listings), firmware, and combinations thereof, as desired by the architect of the memory system 100 and as appropriate for particular implementations of various embodiments.

The apparatus and systems of various embodiments may be useful in applications other than a high-density, multi-link, high-throughput semiconductor memory subsystem 5000. Thus, various embodiments of the invention are not to be so limited. The illustration of the memory system 5000 is intended to provide a general understanding of the structure of various embodiments. It is not intended to serve as a complete description of all the elements and features of apparatus and systems that might make use of the structures described herein.

The novel apparatus and systems of various embodiments may comprise or be incorporated into electronic circuitry used in computers, communication and signal processing circuitry, single-processor or multi-processor modules, single or multiple embedded processors, multi-core processors, data switches, and application-specific modules including multilayer, multi-chip modules. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., MP3 (Motion Picture Experts Group, Audio Layer 3) players), vehicles, medical devices (e.g., heart monitor, blood pressure monitor, etc.), set top boxes, and others. Some embodiments may include a number of methods.

FIGS. 6A, 6B, 6C, and 6D are flow diagrams illustrating a method 1000 according to various example embodiments. The method 1000 includes monitoring at least one operational parameter associated with a memory vault such as voltage, temperature, timing parameters, memory vault utilization statistics, and/or data errors, among others. In some embodiments, the method 1000 may also include adjusting at least one operational parameter associated with the memory vault, such as supply voltage, data strobe timing, and/or defective memory array substitution. The method 1000 may further include performing alerting and reporting operations to a host device.

Figure 6A:
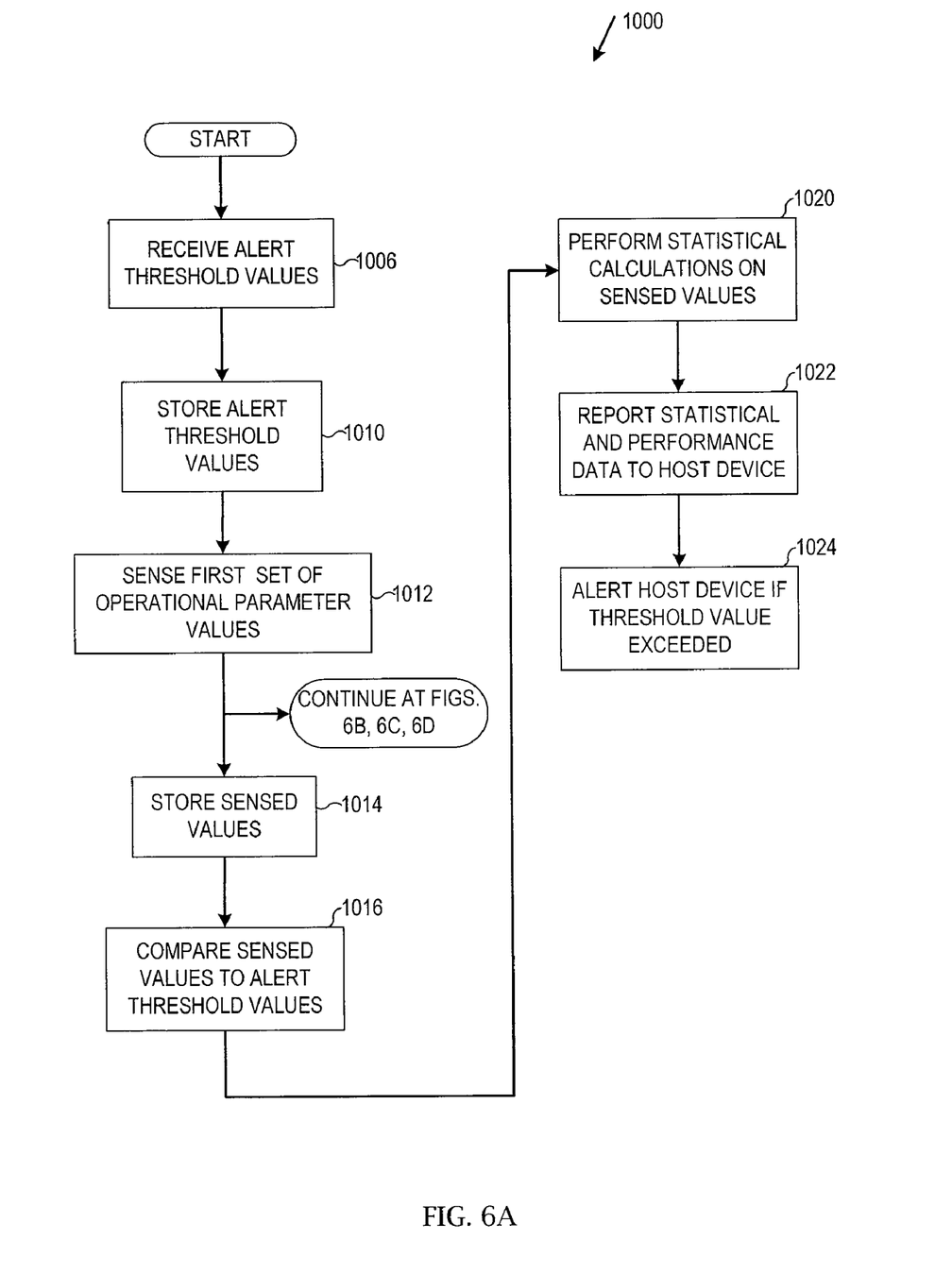
FIGS. 6A, 6B, 6C, and 6D are flow diagrams illustrating a method according to various example embodiments.

The method 1000 may commence at block 1006 with receiving a set of alert threshold values. The method 100 may continue with storing the set of alert threshold values, at block 1010.

The method 1000 may also include sensing a set of values associated with the first set of operational parameters, at block 1012, and storing the set of sensed values, at block 1014. The method 1000 may further include comparing the set of sensed values to corresponding ones of the set of alert threshold values, at block 1016.

The method 1000 may also include performing statistical calculations on the set of sensed values, at block 1020, and reporting statistical and performance data to the host device, at block 1022. In some embodiments, the method 1000 may further include alerting the host device if a sensed value exceeds a corresponding alert threshold value, at block 1024.

Figure 6B:
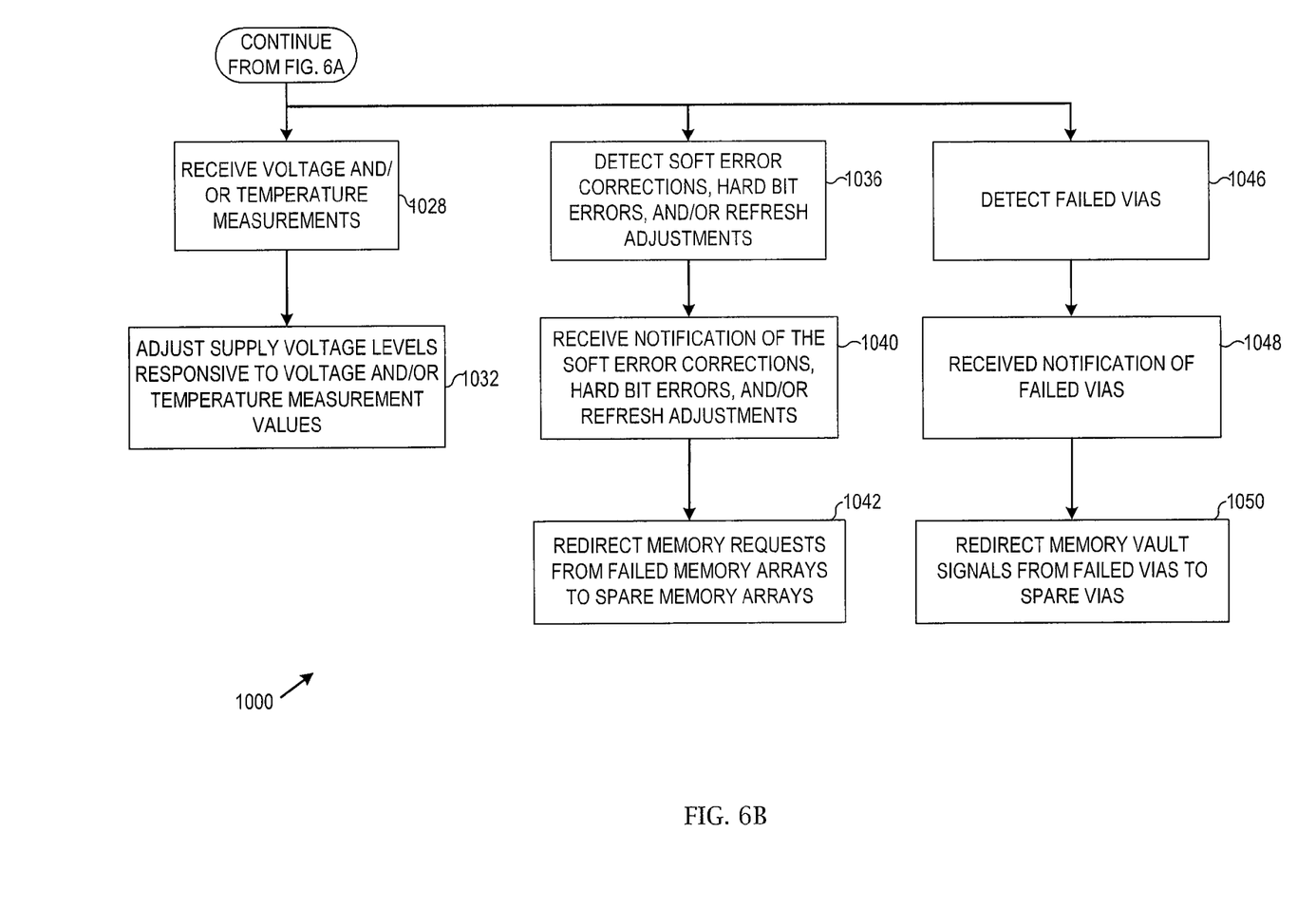

The method 1000 may continue at block 1028 with receiving one or more voltage level measurements or temperature measurements from sensors within the memory vault. Various embodiments may include the sensors at a memory vault level, at a memory array die level, or even at the memory array level. The method 1000 may also include adjusting supply voltage levels within the memory vault responsive to the voltage level measurements or temperature measurements, at block 1032. Such adjustments may be made on the memory vault level, at the memory array die level, or at the memory array level.

The method 1000 may continue at block 1036 with detecting one or more soft error corrections, hard bit failures, and/or refresh adjustments. The errors may be detected at an ECC module (e.g., the ECC module 5020 of FIG. 5A), at the PVCL (e.g., the PVCL 510 of FIG. 5A), and/or at some other suitable point within the logic die 202 or within a memory vault itself. The method 1000 may also include receiving notifications of the soft error corrections, hard bit failures, and/or refresh adjustments, at block 1040. Such notifications may, for example, be received at the dynamic repair module 5022 of FIG. 5A, and may be indicative of a failed or failing memory array. The method 1000 may further include redirecting memory requests from failed memory arrays to spare memory arrays, at block 1042.

The method 1000 may continue at block 1046 with detecting one or more failed conductive paths (referred to hereinafter as a "failed via"), such as a failed through-wafer interconnect (e.g., a conductive path that extends at least partially through a wafer). Failed via events may be detected at the ECC module, at a PVCL, and/or at some other suitable point within the logic die 202 or within the memory vault itself. The method 1000 may also include receiving notifications of the failed vias, at block 1048. Such notifications may, for example, be received at the dynamic repair module 5022 of FIG. 5A. The method 1000 may further include redirecting memory vault signals from the failed vias to spare vias, at block 1050.

Figure 6C:
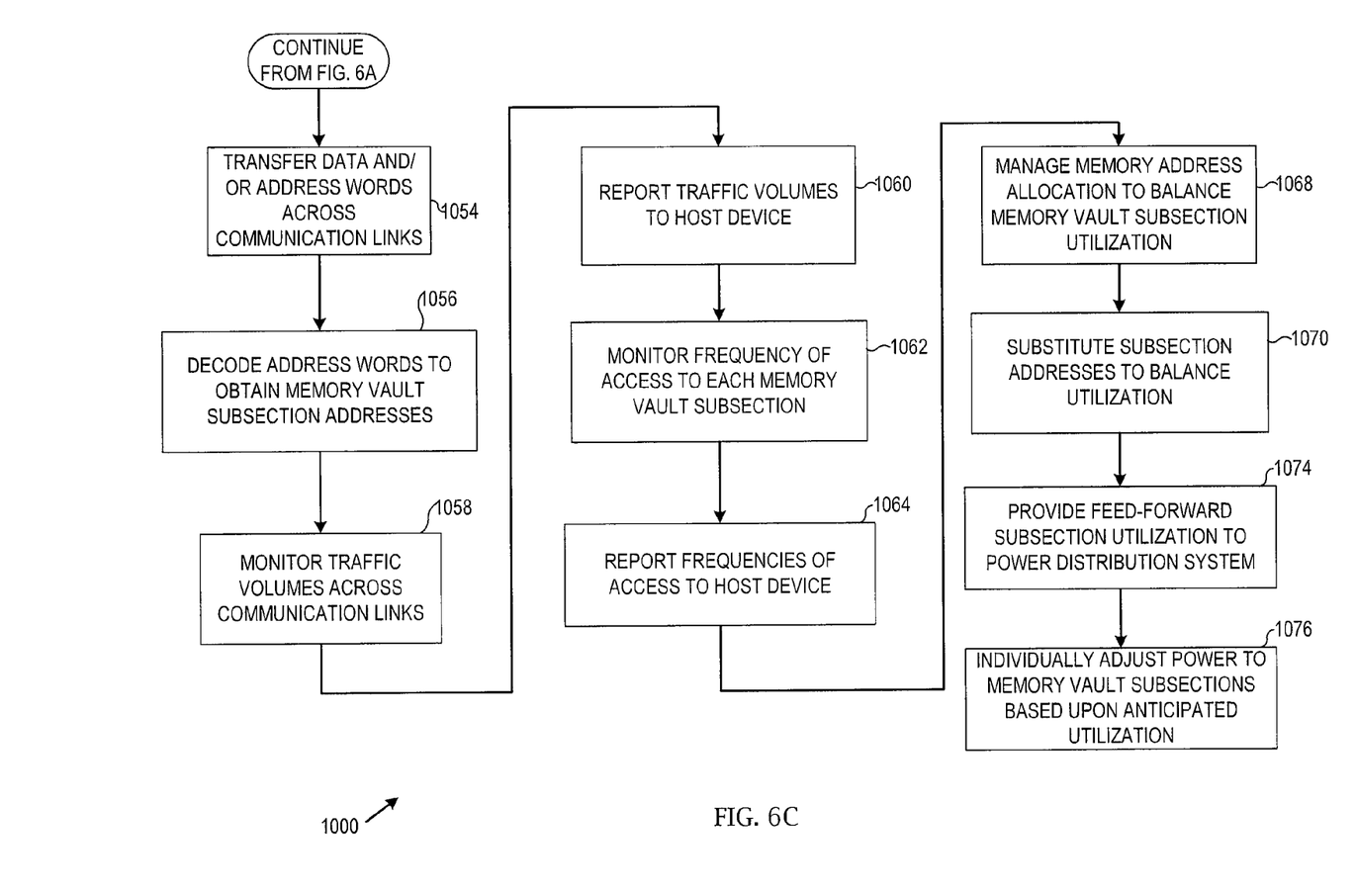

The method 1000 may continue further at block 1054 with transferring data and/or address words across communication links between the host device and the memory vault. The method 1000 may also include decoding the address words to obtain memory vault subsection addresses, at block 1056. Each subsection address corresponds to a subsection of the memory vault. A subsection may comprise a die or a memory array, for example.

The method 1000 may also include monitoring traffic volumes across the communication links, at block 1058, and reporting the traffic volumes to the host device, at block 1060. The method 1000 may further include monitoring frequencies of access to each of the subsections of the memory vault, at block 1062, and reporting the frequencies of access to the host device, at block 1064.

The method 1000 may continue at block 1068 with balancing the utilization of the various subsections of the memory vault by managing memory address allocation. For example, a host device operating system may allocate physical memory to lesser-used memory vault subsections based upon reports of subsection utilization received at the host device from the memory subsystem.

The method 1000 may also include substituting subsection addresses to balance utilization of the various subsections of the memory vault, at block 1070. In some embodiments, for example, the MVC may be directed to substitute lesser-used subsection addresses for heavily used subsection addresses to balance memory vault subsection utilization.

Figure 6D:
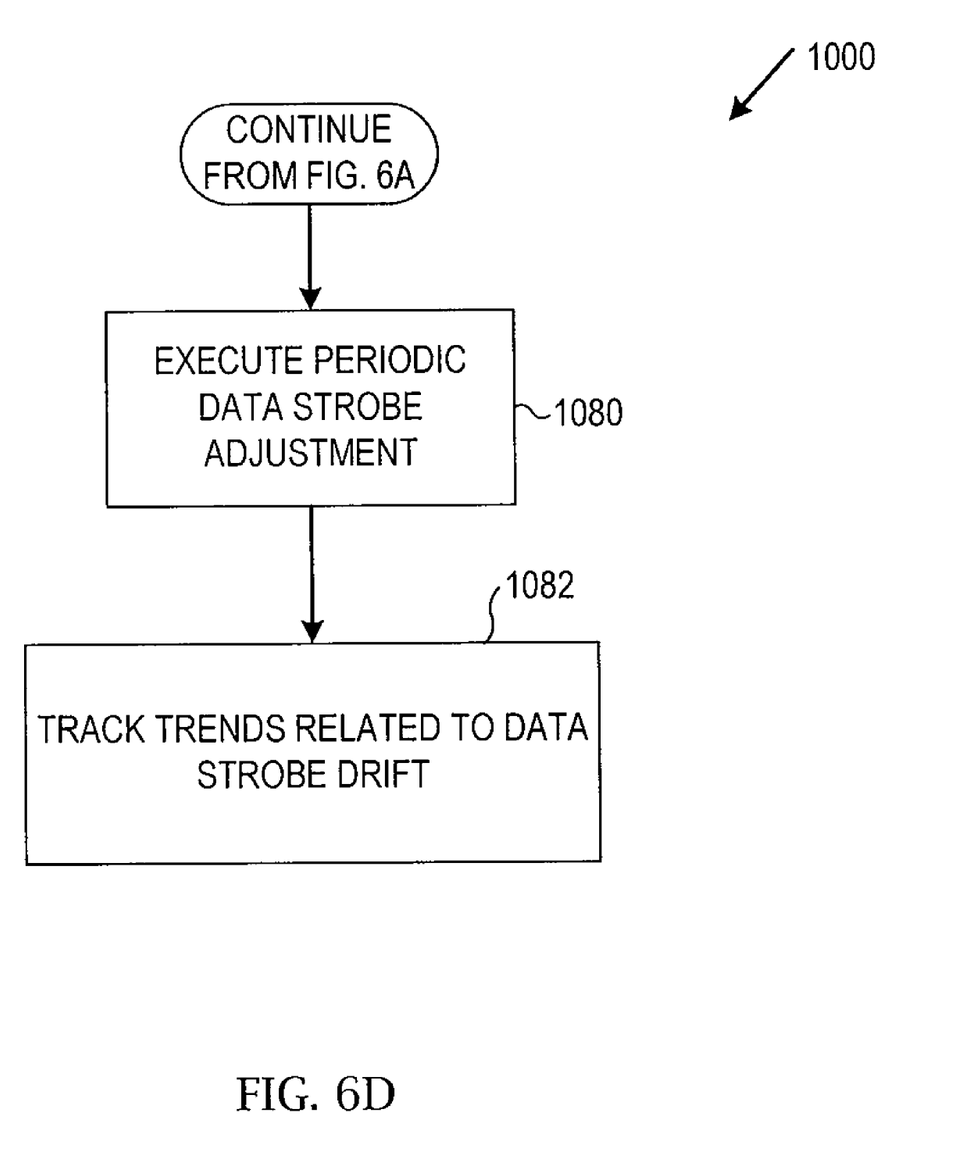

The method 1000 may further include providing feed-forward subsection utilization information to a power distribution system, at block 1074. The subsection utilization information may be used to anticipate power requirements at the various subsections of the memory vault. The method 1000 may also include individually adjusting power availability to the various subsections of the memory vault, at block 1076. For example, the supply voltage may be increased to memory arrays for which a high access load is anticipated.

The method 1000 may continue at block 1080 with conducting a periodic data strobe positioning adjustment routine. That is, data strobe timing to a memory vault, to a memory vault die, or to a memory cell array on a die may be adjusted incrementally through a range while performing a sequence of read or write accesses. Limits of the range may be determined by detecting read or write errors. The center of the range may be calculated as a mid-point between the limits and may be selected as the desired strobe timing, the center of the "data eye." In some embodiments, the method 1000 may include tracking trends related to data strobe drift at the memory vault, the memory vault die, or at a memory cell array on the die, at block 1082.

It is noted that the activities described herein may be executed in an order other than the order described. The various activities described with respect to the methods identified herein may also be executed in repetitive, serial, and/or parallel fashion.

A software program may be launched from a computer-readable medium in a computer-based system to execute functions defined in the software program. Various programming languages may be employed to create software programs designed to implement and perform the methods disclosed herein. The programs may be structured in an object-oriented format using an object-oriented language such as Java or C++. Alternatively, the programs may be structured in a procedure-oriented format using a procedural language, such as assembly or C. The software components may communicate using well-known mechanisms, including application program interfaces, inter-process communication techniques, and remote procedure calls, among others. The teachings of various embodiments are not limited to any particular programming language or environment.

The apparatus, systems, and methods described herein may operate to monitor and adjust operational parameters associated with a memory vault. The operational parameters may be statistically analyzed and reported to a host device coupled to the memory vault. Alert thresholds may be set and alerts issued to the host device if one or more parameters exceed the corresponding thresholds. These tasks may be performed by modules on a logic die stacked with the memory vault, thus offloading such processing from the host device. Higher levels of integration between the monitoring/control functions and the memory vault may result in increased performance at lower cost. For example, data strobe calibration may be performed individually for each die in a stack of dies corresponding to the memory vault. As a consequence, memory array dies with a broader range of timing capabilities may be used to manufacture a memory vault. Increased manufacturing yields and decreased costs may result.

By way of illustration and not of limitation, the accompanying figures show specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense. The breadth of various embodiments is defined by the appended claims and the full range of equivalents to which such claims are entitled.

Such embodiments of the inventive subject matter may be referred to herein individually or collectively by the term "invention" merely for convenience and without intending to voluntarily limit this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments and other embodiments not specifically described herein will be apparent to those of skill in the art upon reviewing the above description.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. A memory system, comprising:
a first memory vault comprising a first stacked plurality of memory arrays, each memory array in the first stacked plurality of memory arrays located on one of a plurality of stacked memory dies;
a second memory vault comprising a second stacked plurality of memory arrays, each memory array in the second stacked plurality of memory arrays located on one of the plurality of stacked memory dies;
a first memory vault controller (MVC) located on a logic die stacked with the plurality of stacked memory dies and communicatively coupled to the first memory vault to provide at least one of control, switching, or communication logic associated with the first memory vault;
a second MVC located on the logic die and communicatively coupled to the second memory vault to provide at least one of control, switching, or communication logic associated with the second memory vault; and
a system monitor processor of the logic die to monitor at least one operational parameter in a first set of operational parameters associated with at least one of the first and second memory vaults and to adjust at least one operational parameter in a second set of operational parameters associated with at least one of the first and second memory vaults.

2. The memory system of claim 1, further comprising:
at least one sensor communicatively coupled to the system monitor processor to sense a value associated with the monitored at least one operational parameter; and
a sensor monitoring module communicatively coupled to the system monitor processor to compare the sensed value to a corresponding threshold value.

3. The memory system of claim 2, wherein the at least one sensor comprises at least one of a voltage sensor, a temperature sensor, a timing measurement device, or a bit error detector.

4. The memory system of claim 2 wherein the at least one sensor is at a memory vault level, a memory array die level, or a memory array level.

5. The memory system of claim 2, further comprising:
a statistical analysis module communicatively coupled to the system monitor processor to perform statistical calculations on the sensed value.

6. The memory system of claim 5, further comprising:
a reporting module communicatively coupled to the system monitor processor and to the statistical analysis module to report at least one of statistical or performance data to an originating device.

7. The memory system of claim 2, further comprising:
an alert module communicatively coupled to the system monitor processor to alert an originating device if the sensed value exceeds the threshold value.

8. The memory system of claim 2, further comprising:
a power distribution system communicatively coupled to the system monitor processor to adjust supply voltage levels responsive to the sensed value.

9. The memory system of claim 8, wherein the power distribution system is configured to adjust supply voltage levels to individual subsections of at least one of the first and second memory vaults according to a power usage level associated with each subsection.

10. The memory system of claim 1, further comprising:
a dynamic repair module communicatively coupled to the system monitor processor to take corrective action responsive to receiving a notification of at least one of a soft error correction, a hard bit failure, a refresh adjustment, or a conductive path failure;
an error correction code (ECC) module communicatively coupled to at least one of the dynamic repair module or the system monitor processor to detect at least one of the soft error, the hard bit failure, the refresh adjustment, or the conductive path failure; and
memory vault repair logic communicatively coupled to the dynamic repair module to redirect memory requests from failed memory arrays to spare memory arrays and to redirect memory vault signals from failed conductive paths to spare conductive paths.

11. The memory system of claim 1, further comprising:
a traffic density monitor communicatively coupled to the system monitor processor to perform at least one of monitoring a frequency of access to subsections of at least one of the first and second memory vaults, monitoring traffic volumes across communication links between the originating device and the memory vault, and reporting the frequency of access and traffic volumes to the originating device.

12. The memory system of claim 11, further including:
programmable vault control logic (PVCL) communicatively coupled to the traffic density monitor to transfer data and address words between the communication links and at least one of the first and second memory vaults and to decode the address words to obtain subsection addresses corresponding to each of the subsections of at least one of the first and second memory vaults.

13. The memory system of claim 12, wherein the traffic density monitor is configured to direct the PVCL to substitute subsection addresses to balance utilization of the subsections of at least one of the first and second memory vaults.

14. The memory system of claim 11, wherein the traffic density monitor is configured to provide feed-forward information to a power distribution system to anticipate power requirements at the subsections of at least one of the first and second memory vaults.

15. The memory system of claim 1, further comprising:
a data eye monitor communicatively coupled to the system monitor processor to perform at least one of conducting a periodic data strobe positioning adjustment routine and tracking trends related to data strobe drift.

16. A method, comprising:
monitoring at least one operational parameter in a first set of operational parameters associated with at least one of a first memory vault and a second memory vault, the first memory vault comprising a first memory array located on a memory die, the second memory vault comprising a second memory array located on the memory die;
adjusting at least one operational parameter in a second set of operational parameters associated with at least one of the first and second memory vaults, wherein adjusting is performed by a system monitor processor located at a logic die separated from the memory die, wherein the logic die is stacked with the memory die; and performing at least one of alerting or reporting operations to an originating device.

17. The method of claim 16, further comprising:
receiving a set of alert threshold values; and
storing the set of alert threshold values.

18. The method of claim 17, wherein monitoring the at least one operational parameter comprises:
sensing a set of values associated with a first set of operational parameters; and
comparing the set of sensed values to corresponding ones of the set of alert threshold values.

19. The method of claim 18, further comprising:
performing statistical calculations on the set of sensed values.

20. The method of claim 16, further comprising:
performing at least one of reporting statistical data and performance data to the originating device, wherein the originating device comprises a host device.

21. The method of claim 16, further comprising:
alerting the originating device if one of the set of sensed values exceeds a corresponding one of the set of alert threshold values.

22. The method of claim 16, wherein monitoring the at least one operational parameter comprises receiving at least one of voltage level measurements or temperature measurements from sensors within at least one of the first and second memory vaults, and wherein adjusting at least one operational parameter associated with at least one of the first and second memory vaults comprises adjusting supply voltage levels to individual memory arrays within at least one of the first and second memory vaults according to a power usage level associated with each array.

23. The method of claim 16, further comprising:
detecting at least one of a soft error correction, a hard bit failure, or a refresh adjustment; and
redirecting memory requests from a failed memory array to a spare memory array responsive to the detecting.

24. The method of claim 16, further comprising:
detecting at least one failed conductive path; and
redirecting memory vault signals from the failed conductive path to a spare conductive path.

25. The method of claim 16, further comprising:
transferring data and address words across communication links between the originating device and at least one of the first and second memory vaults; and
decoding the address words to obtain memory vault subsection addresses corresponding to each of a plurality of subsections associated with at least one of the first and second memory vaults.

26. The method of claim 25, further comprising:
monitoring traffic volumes across the communication links; and
reporting the traffic volumes to the originating device.

27. The method of claim 25, further comprising:
monitoring a frequency of access to the plurality of subsections of at least one of the first and second memory vaults; and
reporting the frequency of access to the originating device.

28. The method of claim 27, further comprising:
balancing a utilization of the plurality of subsections of at least one of the first and second memory vaults by managing memory address allocation.

29. The method of claim 27, further comprising:
substituting subsection addresses to balance utilization of the plurality of subsections of at least one of the first and second memory vaults.

30. The method of claim 27, further comprising:
providing feed-forward subsection utilization information to a power distribution system to anticipate power requirements at the subsections of at least one of the first and second memory vaults; and
individually adjusting power availability to each of the subsections of at least one of the first and second memory vaults.

31. The method of claim 16, further comprising:
perform at least one of conducting a periodic data strobe positioning adjustment routine to center a data eye at a memory vault die and tracking trends related to data strobe drift at the memory vault die.

32. A memory system, comprising:
a first memory vault comprising a first stacked plurality of memory arrays, each memory array in the first stacked plurality of memory arrays located on one of a plurality of stacked memory dies; and
a second memory vault comprising a second stacked plurality of memory arrays, each memory array in the second stacked plurality of memory arrays located on one of the plurality of stacked memory dies; and
a logic die stacked with the plurality of stacked memory dies and comprising:
a first memory vault controller (MVC) communicatively coupled to the first memory vault to provide at least one of control, switching, or communication logic associated with the first memory vault;
a second MVC located on the logic die and communicatively coupled to the second memory vault to provide at least one of control, switching, or communication logic associated with the second memory vault;
a system monitor processor communicatively coupled to the first and second MVC; and
a dynamic repair module communicatively coupled to the system monitor processor to take corrective action responsive to receiving a notification of at least one of a soft error correction, a hard bit failure, a refresh adjustment, or a conductive path failure.

33. The memory system of claim 32, wherein the first and second MVC comprises an error monitor to detect at least one of the soft error, the hard bit failure, the refresh adjustment, or the conductive path failure.

34. The memory system of claim 32, wherein the first and second MVC comprises memory vault repair logic (MVRL) communicatively coupled to the dynamic repair module to perform at least one of redirecting memory requests from failed memory arrays to spare memory arrays and redirecting memory vault signals from failed conductive paths to spare conductive paths.

35. A memory system, comprising:
a first memory vault comprising a first stacked plurality of memory arrays, each memory array in the first stacked plurality of memory arrays located on one of a plurality of stacked memory dies; and
a second memory vault comprising a second stacked plurality of memory arrays, each memory array in the second stacked plurality of memory arrays located on one of the plurality of stacked memory dies; and
a logic die stacked with the plurality of stacked memory dies and comprising:
a first memory vault controller (MVC) communicatively coupled to the first memory vault to provide at least one of control, switching, or communication logic associated with the first memory vault;
a second MVC located on the logic die and communicatively coupled to the second memory vault to provide at least one of control, switching, or communication logic associated with the second memory vault;
a system monitor processor communicatively coupled to the first and second MVC; and
a traffic density monitor communicatively coupled to at least one of the system monitor processor and the first and second MVC to monitor a frequency of access to subsections of at least one of the first and second memory vaults.

36. The memory system of claim 35, wherein the traffic density monitor is further configured to perform at least one of monitoring traffic volumes across communication links between an originating device and at least one of the first and second memory vaults, reporting at least one of the frequency of access, and traffic volumes to the originating device.

37. The memory system of claim 35, wherein the first and second MVC comprises programmable vault control logic (PVCL) communicatively coupled to the traffic density monitor to transfer data and address words between the communication links and at least one of the first and second memory vaults, and to decode the address words to obtain subsection addresses corresponding to each of the subsections of at least one of the first and second memory vaults.

38. The memory system of claim 35, wherein the traffic density monitor is configured to direct the PVCL to substitute subsection addresses to balance utilization of the subsections of at least one of the first and second memory vaults.

39. The memory system of claim 35, wherein the traffic density monitor is further configured to provide feed-forward information to a power distribution system to anticipate power requirements at the subsections of at least one of the first and second memory vaults.

40. A memory system, comprising:
a first memory vault comprising a first stacked plurality of memory arrays, each memory array in the first stacked plurality of memory arrays located on one of a plurality of stacked memory dies; and
a second memory vault comprising a second stacked plurality of memory arrays, each memory array in the second stacked plurality of memory arrays located on one of the plurality of stacked memory dies; and
a logic die stacked with the plurality of stacked memory dies and comprising:
a first memory vault controller (MVC) communicatively coupled to the first memory vault to provide at least one of control, switching, or communication logic associated with the first memory vault;
a second MVC located on the logic die and communicatively coupled to the second memory vault to provide at least one of control, switching, or communication logic associated with the second memory vault;
a system monitor processor communicatively coupled to the first and second MVC; and
a data eye monitor communicatively coupled to at least one of the system monitor processor and the first and second MVC to perform at least one of adjusting data strobe timing and tracking trends related to data strobe drift.

41. The memory system of claim 40, wherein the data eye monitor is configured to:
incrementally adjust data strobe timing to at least one of at least one of the first and second memory vaults, a memory vault die, or to a memory cell array on the memory vault die through a range while performing a sequence of read or write accesses;
determine limits of the range by detecting read or write errors;
calculate a center of the range as a mid-point between the limits; and
selected the center of the range as the desired strobe timing.

42. The memory system of claim 40, where in the data eye monitor is configured to adjust data strobe timing for each of the dies comprising at least one of the first and second memory vaults.

* * * * *

UNITED STATES PATENT AND TRADEMARK OFFICE
CERTIFICATE OF CORRECTION

| | | |
|---|---|---|
| PATENT NO. | : 8,032,804 B2 | |
| APPLICATION NO. | : 12/352381 | |
| DATED | : October 4, 2011 | |
| INVENTOR(S) | : Joe M. Jeddeloh | |

It is certified that error appears in the above-identified patent and that said Letters Patent is hereby corrected as shown below:

In column 16, lines 26-27, in Claim 41, delete "at least one of at least one of" and insert -- at least one of --, therefor.

In column 16, line 36, in Claim 42, delete "where in" and insert -- wherein --, therefor.

Signed and Sealed this

Twentieth Day of December, 2011

David J. Kappos
*Director of the United States Patent and Trademark Office*